United States Patent
Cortez et al.

(10) Patent No.: US 8,029,008 B2
(45) Date of Patent: Oct. 4, 2011

(54) VEHICLE SUSPENSIONS HAVING LEAF SPRINGS AND ALTERNATIVE CLAMP GROUPS

(75) Inventors: Jerome Lim Cortez, Tinley Park, IL (US); Jason Steby Thomas, Westmont, IL (US); Ashley Thomas Dudding, Yorkville, IL (US); William Wilson, Downers Grove, IL (US); Gregory Lewis McClain, Homer Glen, IL (US); Brent Collyer, Milton (CA)

(73) Assignee: Hendrickson USA, L.L.C., Itasca, IL (US)

( * ) Notice: Subject to any disclaimer, the term of this patent is extended or adjusted under 35 U.S.C. 154(b) by 261 days.

(21) Appl. No.: 11/919,534

(22) PCT Filed: Apr. 26, 2006

(86) PCT No.: PCT/US2006/015836
§ 371 (c)(1),
(2), (4) Date: Nov. 2, 2009

(87) PCT Pub. No.: WO2006/116513
PCT Pub. Date: Nov. 2, 2006

(65) Prior Publication Data
US 2010/0038877 A1 Feb. 18, 2010

Related U.S. Application Data

(63) Continuation of application No. 11/115,949, filed on Apr. 27, 2005, now abandoned.

(51) Int. Cl.
*B60G 11/04* (2006.01)

(52) U.S. Cl. .............................................. 280/124.175
(58) Field of Classification Search ................ 267/36.1, 267/41, 52, 53, 260, 269, 270, 271; 280/124.116, 280/124.163, 124.17, 124.175
See application file for complete search history.

(56) References Cited

U.S. PATENT DOCUMENTS 1,200,305 A * 10/1916 Brush ........................... 301/125
1,823,158 A 9/1931 Mogford et al.
(Continued)

FOREIGN PATENT DOCUMENTS
EP 0940322 A1 9/1999
(Continued)

OTHER PUBLICATIONS

Dictionary Definition of Fabricate; Merriam-Webster's 1913 dictionary, available online through University of Chicago, available at http://machaut.uchicago.edu/cgi-bin/WEBSTER.sh?WORD=fabricate (last visited Apr. 14, 2011).*

(Continued)

*Primary Examiner* — Paul N Dickson
*Assistant Examiner* — Joseph Rocca
(74) *Attorney, Agent, or Firm* — Cook Alex Ltd.

(57) ABSTRACT

A vehicle leaf spring suspension having a low spring rate is disclosed. The suspension has an axle seat secured to a vehicle axle. The leaf spring is clamped at its spring seat area to the axle seat at the clamp group mounting surface of the axle seat and with certain of the disclosed axle seats, can be clamped such that the spring seat area is asymmetrically positioned with respect to the vehicle axle centerline. Also, an active clamp group arrangement can be used to utilize the entire physical length of the leaf spring.

20 Claims, 10 Drawing Sheets

U.S. PATENT DOCUMENTS

| | | | |
|---|---|---|---|
| 1,899,347 | A | 2/1933 | Mogford et al. |
| 1,924,984 | A | 8/1933 | Fageol |
| 2,080,123 | A * | 5/1937 | Francis .......................... 280/680 |
| 2,929,618 | A * | 3/1960 | Hutchens ....................... 267/30 |
| 3,195,876 | A * | 7/1965 | Tea ................................ 267/52 |
| 3,250,546 | A | 5/1966 | Allison |
| 3,510,149 | A * | 5/1970 | Raidel ........................ 280/86.75 |
| 3,602,523 | A | 8/1971 | Poulos |
| 3,612,572 | A * | 10/1971 | Raidel ........................ 280/86.75 |
| 3,767,222 | A | 10/1973 | Willetts |
| 3,895,819 | A | 7/1975 | Willetts |
| 4,322,061 | A * | 3/1982 | Masser .......................... 267/269 |
| 4,519,590 | A * | 5/1985 | Wells ............................. 267/52 |
| 4,630,804 | A * | 12/1986 | Fesko ............................. 267/52 |
| 4,684,110 | A * | 8/1987 | Sale et al. ........................ 267/52 |
| 4,895,350 | A * | 1/1990 | Schoof et al. .................... 267/52 |
| 4,902,035 | A | 2/1990 | Raidel |
| 4,919,399 | A * | 4/1990 | Selzer et al. ..................... 267/31 |
| 5,133,573 | A | 7/1992 | Kijima et al. |
| 5,271,638 | A | 12/1993 | Yale |
| 5,429,423 | A * | 7/1995 | Pollock et al. ............. 301/124.1 |
| 5,476,251 | A * | 12/1995 | Moses et al. ..................... 267/52 |
| 5,560,641 | A * | 10/1996 | Vogler .................... 280/124.163 |
| 5,588,660 | A | 12/1996 | Paddison |
| 5,634,655 | A * | 6/1997 | Chalin .................... 280/124.165 |
| 5,741,027 | A | 4/1998 | Stroh et al. |
| 5,810,377 | A | 9/1998 | Keeler et al. |
| 5,865,452 | A | 2/1999 | Chalin |
| 5,873,581 | A * | 2/1999 | Yale ........................... 280/5.514 |
| 5,921,570 | A * | 7/1999 | Lie .......................... 280/124.175 |
| 6,032,967 | A * | 3/2000 | Ogoniek ............... 280/124.175 |
| 6,073,946 | A | 6/2000 | Richardson |
| 6,082,750 | A * | 7/2000 | Merkler et al. ........ 280/124.175 |
| 6,237,304 | B1 | 5/2001 | Wycech |
| 6,241,266 | B1 * | 6/2001 | Smith et al. ............ 280/124.116 |
| 6,352,245 | B1 * | 3/2002 | Norden .......................... 267/36.1 |
| 6,394,473 | B1 | 5/2002 | Platner |
| 6,416,136 | B1 | 7/2002 | Smith |
| 6,491,314 | B2 | 12/2002 | Smith |
| 6,508,482 | B2 | 1/2003 | Pierce et al. |
| 6,536,789 | B2 | 3/2003 | Svensson et al. |
| 6,609,764 | B2 | 8/2003 | Dudding et al. |
| 6,616,156 | B1 | 9/2003 | Dudding et al. |
| 6,799,811 | B1 | 10/2004 | Dauber et al. |
| 6,805,369 | B2 * | 10/2004 | Galazin ................. 280/124.116 |
| 6,808,192 | B1 | 10/2004 | Bol |
| 6,820,884 | B2 | 11/2004 | McCann et al. |
| 6,834,874 | B1 | 12/2004 | Overby |
| 7,131,652 | B2 | 11/2006 | Ramsey |
| 7,328,908 | B2 | 2/2008 | Barber et al. |
| 7,360,773 | B2 | 4/2008 | Gottschalk |
| 7,360,774 | B2 | 4/2008 | Saieg et al. |
| 7,445,220 | B2 | 11/2008 | von Mayenburg et al. |
| 7,464,948 | B2 | 12/2008 | Ramsey |
| 7,484,745 | B2 | 2/2009 | Soles et al. |
| 7,690,660 | B2 * | 4/2010 | Dudding et al. ....... 280/124.116 |
| 7,748,726 | B2 | 7/2010 | Dudding et al. |
| 2002/0096854 | A1 | 7/2002 | Martinez |
| 2004/0080135 | A1 * | 4/2004 | Dudding et al. ....... 280/124.163 |
| 2004/0104553 | A1 * | 6/2004 | Richardson ............ 280/124.163 |
| 2005/0168057 | A1 * | 8/2005 | Eschenburg .................. 301/137 |
| 2005/0218620 | A1 * | 10/2005 | Reineck ................. 280/124.116 |
| 2006/0113739 | A1 | 6/2006 | Spetz et al. |
| 2006/0244232 | A1 | 11/2006 | Cortez et al. |
| 2006/0244236 | A1 | 11/2006 | Cortez et al. |
| 2008/0018070 | A1 | 1/2008 | Gottschalk |
| 2008/0067771 | A1 | 3/2008 | Varela et al. |
| 2008/0238015 | A1 | 10/2008 | Duddling et al. |
| 2008/0252031 | A1 | 10/2008 | Dudding et al. |
| 2010/0187789 | A1 | 7/2010 | Dudding et al. |

FOREIGN PATENT DOCUMENTS

| | | | |
|---|---|---|---|
| EP | 1145878 | A2 | 10/2001 |
| EP | 1270282 | A2 | 1/2003 |
| JP | 47-21312 | | 3/1972 |
| JP | 9002033 | A | 1/1997 |
| JP | 2000108632 | A | 4/2000 |

OTHER PUBLICATIONS

Dictionary Definition of Fabricate; The Online Plain Text English Dictionary, available at http://www.onelook.com/?other=web1913&w=Fabricate (last visited Apr. 14, 2011).*

United States Patent and Trademark Office, Office Action dated Jan. 25, 2007 for U.S. Appl. No. 11/115,949.

United States Patent and Trademark Office, Office Action dated Apr. 8, 2008 for U.S. Appl. No. 11/734,671.

United States Patent and Trademark Office, Office Action dated Jan. 6, 2009 for U.S. Appl. No. 11/734,671.

United States Patent and Trademark Office, Office Action dated Feb. 24, 2009 for U.S. Appl. No. 11/734,671.

United States Patent and Trademark Office, Office Action dated Jun. 24, 2009 for U.S. Appl. No. 11/734,671.

United States Patent and Trademark Office, Office Action dated Dec. 24, 2009 for U.S. Appl. No. 11/734,671.

United States Patent and Trademark Office, Office Action dated Jun. 3, 2009 for U.S. Appl. No. 11/693,362.

United States Patent and Trademark Office, Office Action dated Jul. 21, 2010 for U.S. Appl. No. 12/752,784.

United States Patent and Trademark Office, Office Action dated Feb. 17, 2011 for U.S. Appl. No. 12/752,784.

International Search Report for PCT Appln. No. PCT/US06/15836, dated Apr. 20, 2007.

International Preliminary Report on Patentability for PCT Appln. No. PCT/US06/15836, dated Oct. 30, 2007.

European Search Report for European Patent Appln. No. 06751505.6, dated Oct. 27, 2010.

International Search Report and Written Opinion for PCT Appln. No. PCT/US08/58353, dated Jun. 9, 2009.

International Preliminary Report on Patentability for PCT Appln. No. PCT/US08/58353, dated Oct. 13, 2009.

European Search Report for European Patent Appln. No. 08799722.7, dated Nov. 19, 2010.

International Search Report for PCT Appln. No. PCT/US08/58357, dated Aug. 20, 2008.

International Preliminary Report on Patentability for PCT Appln. No. PCT/US08/58357, dated Nov. 17, 2009.

European Search Report for European Patent Appln. No. 08732894.4, dated Mar. 11, 2011.

ArvinMeritor RideStar RAL Front Air Suspension, 2003 Mid-America Trucking Show, circa 2003.

Hendrickson USA, L.L.C., Composolite FX—Fixed-Axle Suspension System, circa 2006.

Office Action from Instituto Mexicano de la Propiedad Industrial for Mexican Patent Appln. No. MX/a/2007/013292, dated Oct. 27, 2010, and partial translation.

Office Action from Instituto Mexicano de la Propiedad Industrial for Mexican Patent Appln. No. MX/a/2007/013292, dated May 3, 2011, and partial translation.

Examination Report for New Zealand Patent Appln. No. 562924, dated Aug. 6, 2009.

Notification of the First Office Action for Chinese Patent Appln. No. 200880010747.8, dated Jan. 11, 2011, and translation.

Notification of the First Office Action for Chinese Patent Appln. No. 200680016894.7, dated Feb. 6, 2009, and translation.

Notification of the Second Office Action for Chinese Patent Appln. No. 200680016894.7, dated Jul. 17, 2009, and translation.

Notification of the Third Office Action for Chinese Patent Appln. No. 200680016894.7, dated Nov. 6, 2009, and translation.

Notification of the First Office Action for Chinese Patent Appln. No. 200880011799.7, dated Sep. 30, 2010, and translation.

Notification of the First Office Action for Chinese Patent Appln. No. 201010241572.0, dated Feb. 11, 2011, and translation.

Office Action from Japanese Patent Office for Japanese Patent Appln. No. 2008-509086, circa Jun. 2011.

* cited by examiner

VEHICLE SUSPENSIONS HAVING LEAF SPRINGS AND ALTERNATIVE CLAMP GROUPS

CROSS REFERENCE TO RELATED APPLICATIONS

This application is a National Stage filing of PCT patent application no. PCT/US2006/015836, filed Apr. 26, 2006, which is a continuation of U.S. patent application Ser. No. 11/115,949, filed Apr. 27, 2005 now abandoned.

BACKGROUND OF THE INVENTION

The present invention relates to vehicle suspensions and components thereof. More particularly, the present invention relates to leaf spring suspensions.

Leaf springs are commonly used as active components in vehicle suspensions. Examples of suspensions using a leaf spring are shown and described in U.S. Pat. No. 5,938,221 (Wilson), the disclosure of which is hereby incorporated herein by reference.

One of the shortcomings associated with the design of leaf spring suspensions is due to the fact that in order to lower the vertical spring rate to a desirable level, the leaf spring sometimes must be increased in length beyond the packaging constraints of the vehicle. In particular, in certain vehicles, there are limitations on the space available to accommodate the longer length spring required to achieve a lower spring rate for a given suspension.

Another shortcoming associated with the design of leaf spring suspensions is that the axle travel is conventionally limited by the maximum allowable leaf spring deflection, which is limited by the peak stress of the leaf spring and in turn is a characteristic based on the material of construction for the leaf spring. In some cases, leaf spring suspensions having a desired spring rate cannot be used because the stress imparted upon the leaf spring is too great and/or the maximum allowable leaf spring deflection would not support the load required within the maximum axle travel limits.

Another shortcoming associated with leaf spring suspensions that use air springs is that if the one or more air springs are not balanced about the vehicle axle centerline, excessive deflection and/or high stress gradients could be exerted on the leaf spring during vertical loading and would also add to spring windup during acceleration and braking. For front air suspensions using a single air spring, the maximum vehicle load would necessitate use of a large diameter air spring, which could be difficult to package in the available space.

Another shortcoming associated with leaf spring suspensions is that conventionally the attachment of the leaf spring to the vehicle axle has been carried out in a way that produces a mechanical metal-to-metal connection between the leaf spring and the axle. This conventional means of connecting the leaf spring to the vehicle axle negates utilization of a section of the leaf spring, namely its spring seat section, as part of the active component, giving the leaf spring a shorter effective length than its true physical length and increasing the overall spring rate of the leaf spring. In addition, this metal-to-metal connection can be a limitation of the fatigue life for the leaf spring.

Another shortcoming associated with leaf spring suspensions is that fabricated axle seats have not been applied to front fabricated steer axles. The vehicle components conventionally used have been more costly in terms of manufacturing and material costs. In addition, the conventional vehicle components have been heavier, which in the case of commercial vehicles, translates into reduced payload capacity.

Accordingly, it is desirable to overcome one or more of the foregoing shortcomings, or alternatively other shortcomings not specified herein but associated with prior leaf spring suspensions.

The benefits of the preferred forms of the novel subject matter set forth herein will become apparent from the following description. It will be understood, however, that an apparatus could still appropriate the invention claimed herein without accomplishing each and every one of those benefits gleaned from the following description. The appended claims, not the benefits of the novel subject matter set forth herein, define the subject matter protected by law. Any and all benefits are derived from the preferred forms of the invention, not necessarily the invention in general.

BRIEF DESCRIPTION OF THE SEVERAL VIEWS OF THE DRAWING

In the following detailed description, reference will frequently be made to the following views of the drawing, in which like reference numerals refer to like components, and in which.

DETAILED DESCRIPTION OF THE INVENTION

FIGS. 1-4 illustrate some of the vehicle components present on one side of a vehicle. Illustrated in FIGS. 1-4 are a vehicle axle 30 and its associated vehicle suspension. Vehicle axle 30 is shown in the form of a front fabricated vehicle steering axle. The details of the structure of the illustrated vehicle axle 30 are set forth in U.S. Pat. No. 6,609,764 (Dudding et al.), the disclosure of which is hereby incorporated herein by reference. Vehicle axle 30 extends laterally across the vehicle. It will be understood that the opposite side of the vehicle includes the opposite side of vehicle axle 30 and duplicate suspension components.

The vehicle suspension illustrated in FIGS. 1-4 includes a steering knuckle 32 having a spindle 34 mounted on the end of vehicle axle 30 in known manner by a king pin (not shown). Steering knuckle 32 and spindle 34 preferably embody one of the forms disclosed in U.S. Pat. No. 6,616,156 (Dudding et al.), the disclosure of which is also hereby incorporated herein by reference. A vehicle wheel (not shown) is mounted on spindle 34 in known manner.

A tie rod 36 is connected to a tie rod arm 32a of the steering knuckle and extends laterally across the vehicle centerline from one side of the vehicle to the other side. The opposite end of tie rod 36 is connected to the tie rod arm of the steering knuckle positioned on the opposite side of the vehicle. With this arrangement, tie rod 36 can be used to control steering of the vehicle.

The vehicle suspension also includes a shock absorber 38 connected between axle seat 44 and a vehicle frame rail (not shown). The referenced vehicle frame rail is preferably a longitudinally extending member having the standard C-shaped cross-section well known in the art and as shown in the incorporated U.S. Pat. No. 5,938,221. A first shock absorber mounting unit 40 including ears 40a and 40b is welded or otherwise attached to axle seat 44. A second shock absorber mounting unit 42 is bolted or otherwise attached to the vehicle frame. The second shock absorber mounting unit 42 is illustrated in the form of a mounting bracket but may take other forms. Shock absorber 38 can be connected between first shock absorber mounting unit 40 and second shock absorber mounting unit 42 in the illustrated manner.

The vehicle suspension also includes an axle seat 44 press-fit to vehicle axle 30 in a manner such that the axle seat sits atop the vehicle axle. Axle seat 44 is preferably constructed as a fabricated assembly, but those skilled in the art will appreciate that this axle seat could also be made as a casting. The axle seat 44 illustrated in FIGS. 1-4 is better illustrated in FIGS. 5 and 6. Accordingly, the details of axle seat 44 shall be described herein with reference to FIGS. 5 and 6.

The vehicle suspension also includes a leaf spring shown in the form of a dual-leaf leaf spring 46 extending longitudinally and connected to the vehicle frame at separated points thereof by frame hanger brackets, shackles or similar vehicle suspension components (not shown), as is well known in the art and as is illustrated in the incorporated U.S. Pat. No. 5,938,221. The dual-leaf leaf spring 46 includes a full leaf 46a having eyes 48, 50 on opposite ends thereof to allow the dual-leaf leaf spring to be connected to the vehicle frame rail at its opposite ends. The dual-leaf leaf spring 46 also includes a half leaf 46b having a military wrap 52 positioned on one end thereof. The other end of the half leaf 46b and a mid-portion of full leaf 46a are clamped to axle seat 44 through use of inverted U-bolts 54a, 54b (see also FIG. 5). The full leaf 46a and half leaf 46b are also secured together by a spring clip 47 and by the military wrap 52 inasmuch as it extends around the outside of the outside diameter of leaf spring eye 48.

Leaf spring 46 can be considered to have five general sections. The first section of leaf spring 46 is front spring eye 48. The second section of leaf spring 46 is the front limb, which extends generally from the front spring eye 48 of the leaf spring to the front portion of the clamp group section of the suspension. The third section of leaf spring 46 is the spring seat section, which corresponds to that section of the leaf spring that extends along the clamp group section of the suspension. The fourth section of leaf spring 46 is the rear limb, which extends generally from the rear portion of the clamp group section of the suspension to the rear spring eye 50 of the leaf spring. The fifth section of leaf spring 46 is its rear spring eye 50. The rear limb of leaf spring 46 is longer and thinner than the front limb of the leaf spring. With this construction, the rear limb of leaf spring 46 contributes less to the roll stiffness than the front limb of the leaf spring. The rear limb of leaf spring 46 adds to suspension articulation.

The vehicle suspension also includes a front air spring 62 seated on and secured to an axle clamp top pad 64 (see also FIG. 5) and also secured to an air spring mounting bracket 66. Air spring mounting bracket 66 is mounted to the longitudinally extending vehicle frame rail.

The vehicle suspension also includes a rear air spring 68 seated on and secured to axle seat 44 (see also FIG. 5) and also secured to an air spring mounting bracket (not shown), which in turn is mounted to the vehicle frame rail.

As illustrated in FIGS. 1-4, front air spring 62 has a diameter smaller than the diameter of rear air spring 68. Front air spring 62 is positioned in front of the vehicle axle centerline, and rear air spring 68 is positioned behind the vehicle axle centerline.

Figure 1:
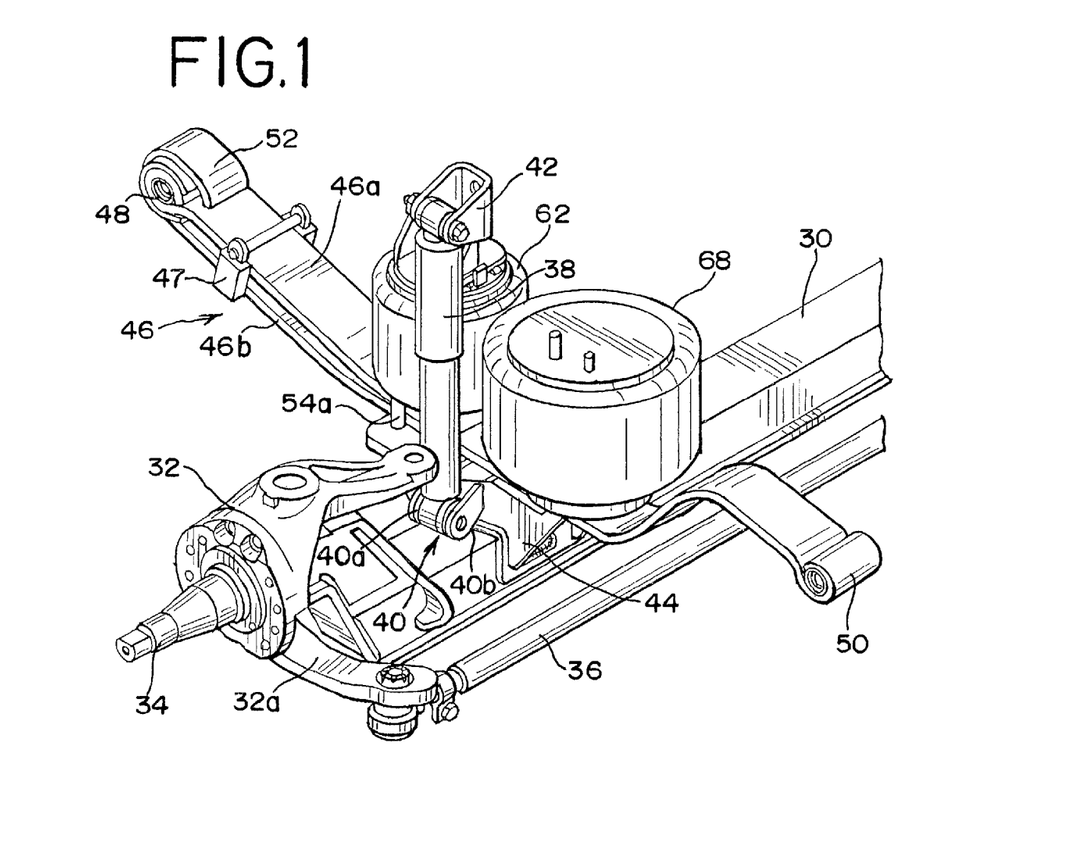
FIG. 1 is a perspective view of a vehicle axle and vehicle suspension components constructed in accordance with the principles and teachings set forth herein.
Figure 2:
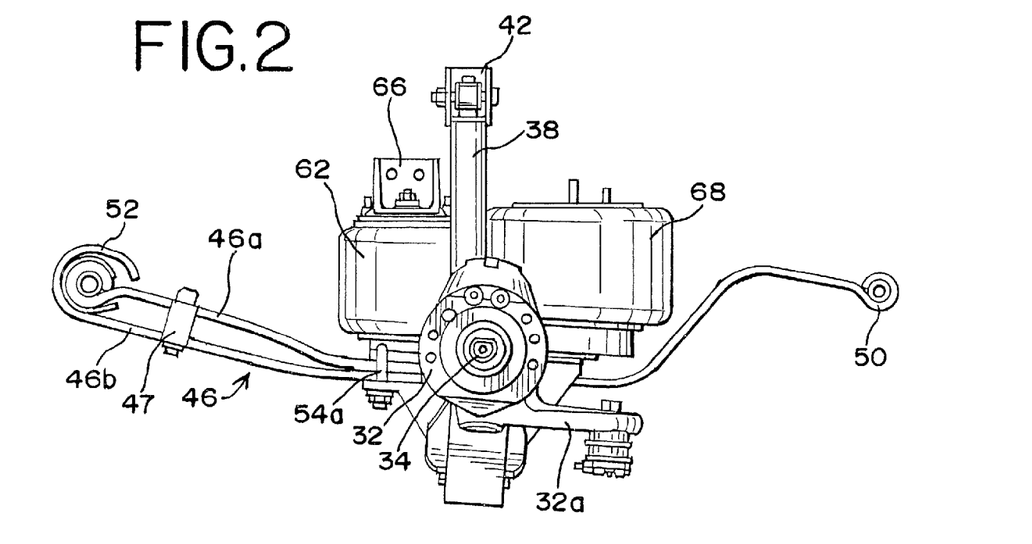
FIG. 2 is a side view of the vehicle axle and vehicle suspension components illustrated in FIG. 1.
Figure 3:
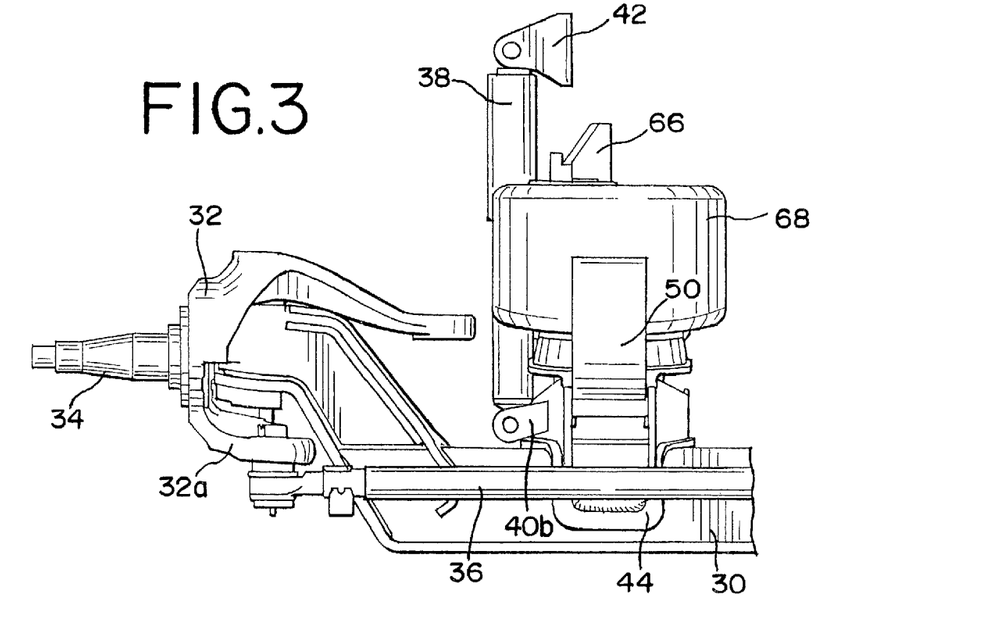
FIG. 3 is a rear view of the vehicle axle and vehicle suspension components illustrated in FIGS. 1-2.
Figure 4:
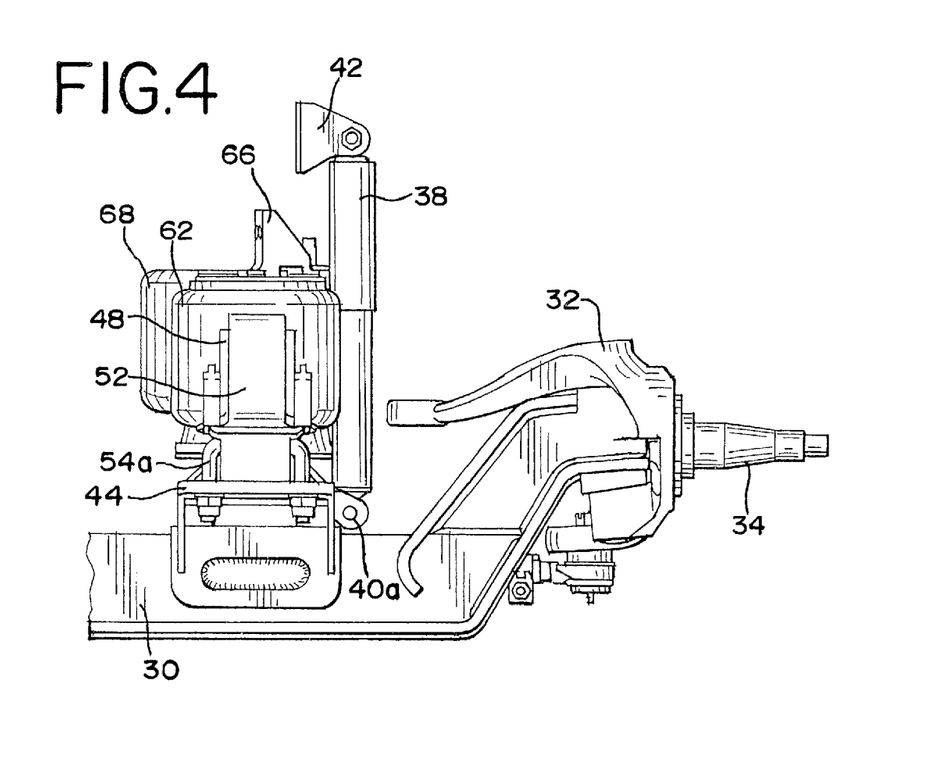
FIG. 4 is a front view of the vehicle axle and vehicle suspension components illustrated in FIGS. 1-3.
Figure 5:
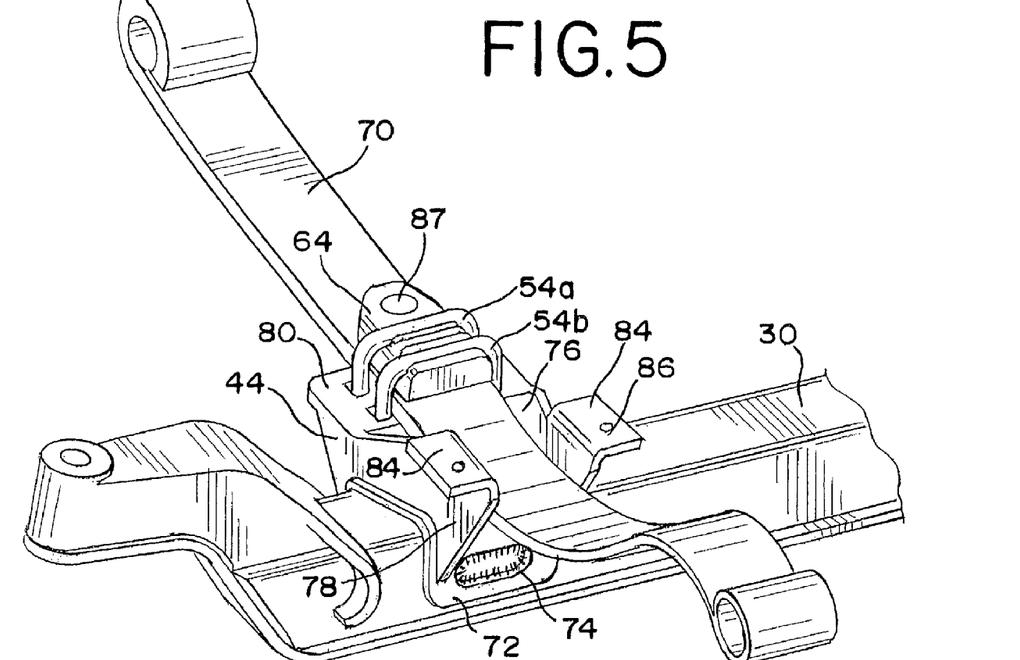
FIG. 5 is a perspective view of the vehicle axle and axle clamp assembly components illustrated in FIGS. 1-4, showing a leaf spring extending transversely to the vehicle axle.
Figure 6:
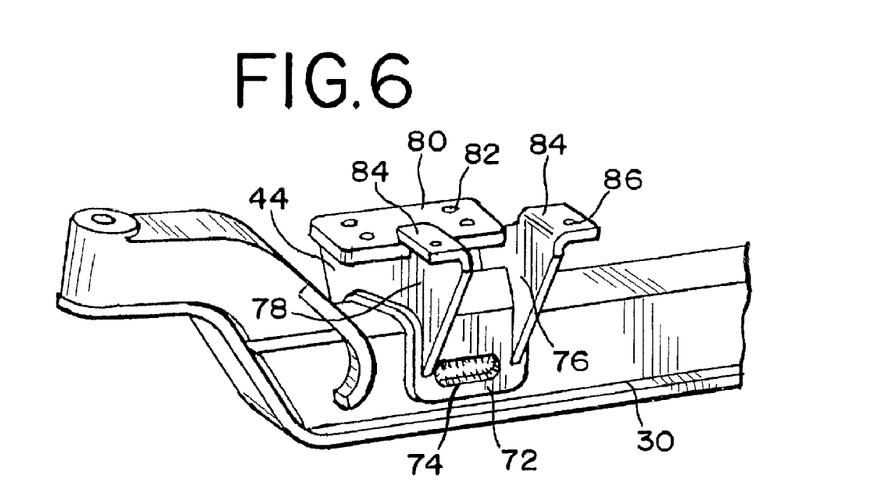
FIG. 6 is a perspective view of the vehicle axle and certain of the axle clamp assembly components illustrated in FIGS. 1-5.

Referring to FIGS. 5-6, the axle seat 44 illustrated in FIGS. 1-4 is illustrated therein. FIGS. 5-6, however, illustrate a mono-leaf leaf spring 70, which preferably is constructed in accordance with the teachings of U.S. Pat. No. 5,938,221. It will be appreciated that the full leaf 46a of the dual-leaf leaf spring 46 illustrated in FIGS. 1-4 also preferably has such construction.

As shown in FIGS. 5-6, the axle seat 44 includes a C-shaped seat portion 72 that extends over most of the front and rear sides of the axle body and over the top side of the axle body. With this construction, seat portion 72 of axle seat 44 has an open end. The axle seat portion 72 is press-fit onto the vehicle axle 30. The front and rear sides of the seat portion 72 of axle seat 44 include racetrack shaped cutouts 74 that permit axle seat 44 to be welded to vehicle axle 30 (see also FIG. 4). In particular, weld lines are formed about the perimeter of the racetrack shaped cutouts 74 on the front and rear sides of the axle body. The vertical and longitudinal loads are carried by the mechanical press-fit connection of axle seat portion 72 to vehicle axle 30, while the braking, acceleration and lateral loads are carried by the weld formed about the perimeter of racetrack 74.

Axle seat 44 also includes inboard and outboard sidewalls 76, 78 extending from the C-shaped seat portion 72. Positioned on top of sidewalls 76, 78 at the front portion of the sidewalls is a clamp group mounting surface 80. Clamp group mounting surface 80 is positioned forward of vehicle axle 30 and includes bores 82 sized to receive the legs of the inverted U-bolts. The legs of the inverted U-bolts preferably have threaded ends and are fastened to the underside of axle seat 44 by appropriate fastener nuts or similar fastening components.

Axle seat 44 also includes air spring mounting flanges 84 extending laterally from the inboard and outboard axle seat sidewalls 76, 78. The air spring mounting flanges 84 have bores 86 extending through them to enable the rear air spring to be secured to the axle seat. The air spring mounting flanges 84 are spaced apart to provide an area through which leaf spring 70 may extend.

In that regard, leaf spring 70 extends longitudinally, as described above, such that the spring seat area thereof extends over clamp group mounting surface 80. Axle clamp top pad 64 is positioned on top of the spring seat area of leaf spring 70 and inverted U-bolts 54a, 54b are used to clamp the leaf spring to axle seat 44 between axle clamp top pad 64 and the clamp group mounting surface 80 of the axle seat. The clamp group mounting surface 80 is positioned ahead of the vehicle axle such that the spring seat area of leaf spring 70 (i.e., that portion of the leaf spring clamped to the clamp group mounting surface) is not positioned symmetrically about the vehicle axle. A metal-to-metal mechanical connection between the leaf spring 70 and the axle seat 44 is achieved. Axle clamp top pad 64 includes grooved portions to accommodate the inverted U-bolts 54a, 54b. Axle clamp top pad 64 also includes a bore 87 to permit the front air spring to be secured thereto.

Figure 7:
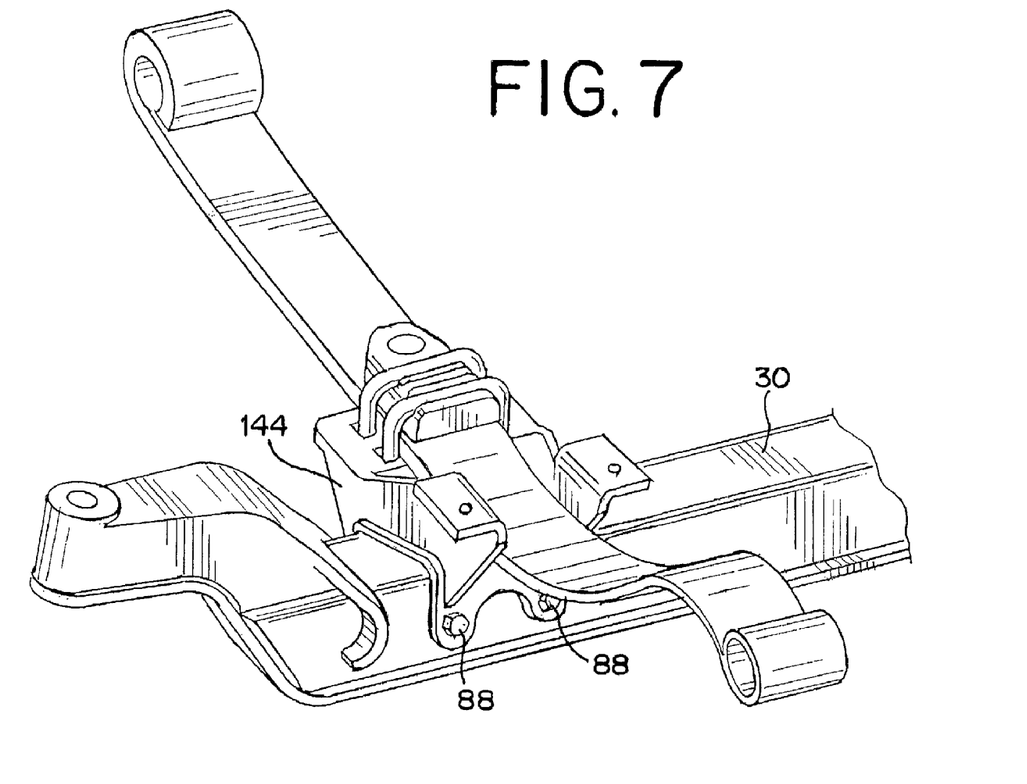
FIG. 7 is a perspective view illustrating another embodiment of the axle clamp assembly components.
Figure 8:
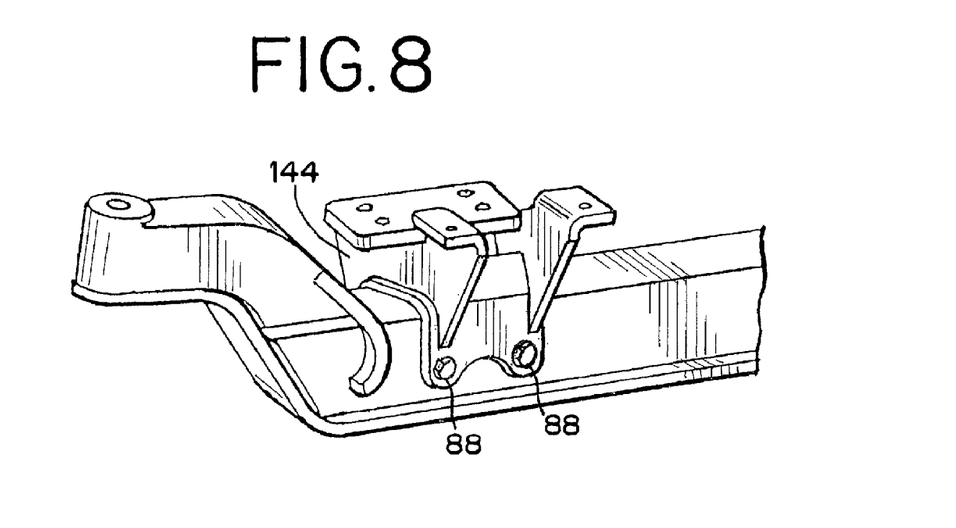
FIG. 8 is a perspective view illustrating certain of the axle clamp assembly components illustrated in FIG. 7.

FIGS. 7-8 illustrate an axle seat 144 having a construction similar to the axle seat 44 illustrated in FIGS. 1-6. Axle seat 144, however, is secured to the axle body of vehicle axle 30 by fasteners 88 shown in the form of bolts, which extend through bores formed within the C-shaped seat portion of axle seat 144. Further details regarding this use of fasteners in lieu of the described welding will be described hereinafter with reference to other figures in the drawing of this application.

Figure 9:
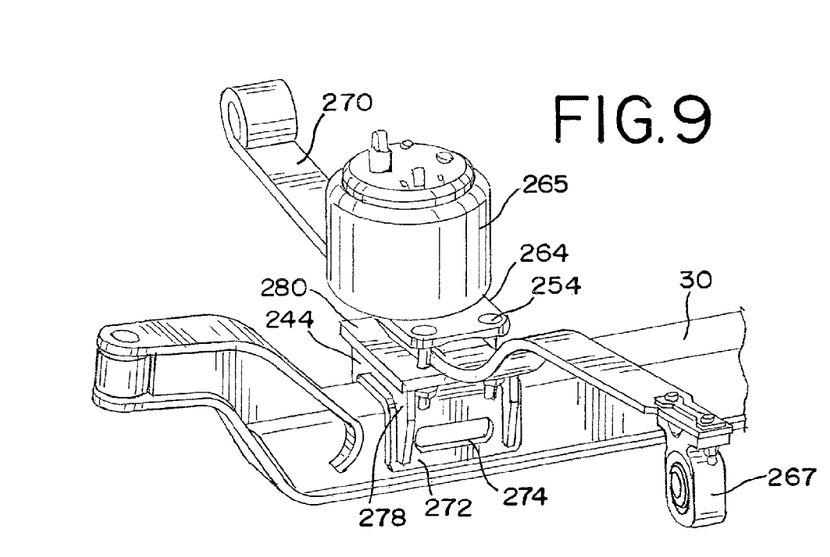
FIG. 9 is a perspective view of a vehicle axle and vehicle suspension components constructed in accordance with the principles and teachings set forth herein.
Figure 10:
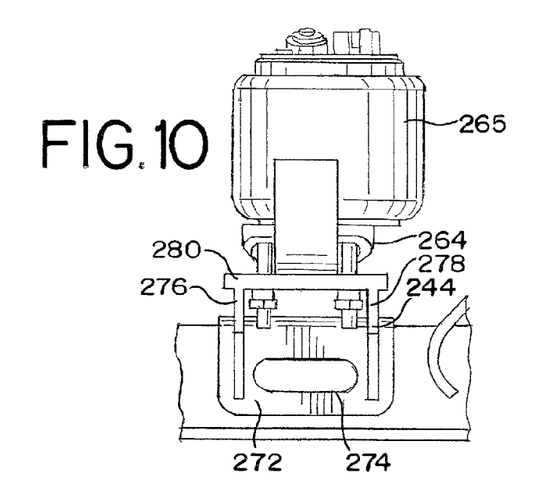
FIG. 10 is a front view of the vehicle axle and vehicle suspension components illustrated in FIG. 9.
Figure 11:
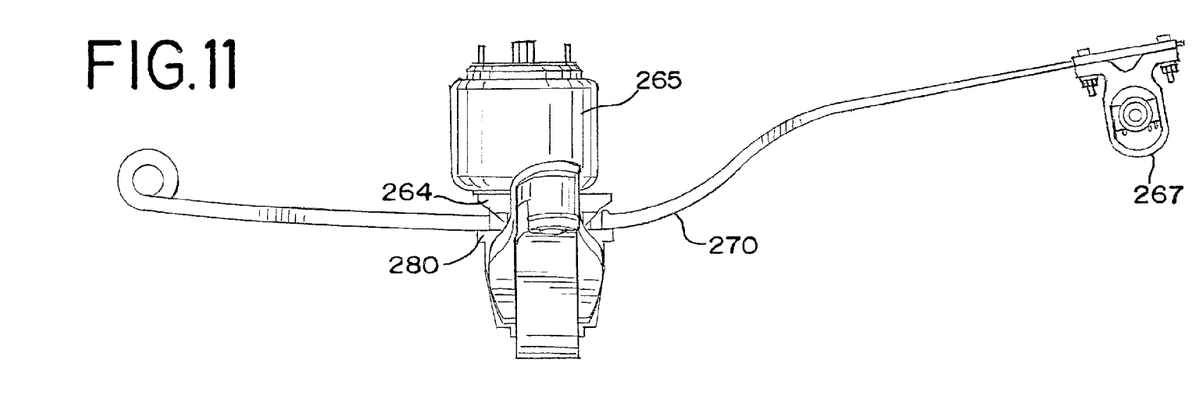
FIG. 11 is a side view of the vehicle axle and vehicle suspension components illustrated in FIGS. 9-10.

FIGS. 9-11 illustrate a fabricated axle seat 244. Fabricated axle seat 244 includes a C-shaped axle seat portion 272 that extends over most of the front and rear sides of the axle body and over the top side of the axle body, leaving an open end over the box-shaped axle body. The axle seat portion 272 is press-fit to the vehicle axle body. The front and rear sides of the seat portion 272 of axle seat 244 include racetrack shaped cutouts 274 that permit axle seat 244 to be welded to vehicle axle 30. In particular, weld lines are formed about the perimeter of the racetrack shaped cutouts 274 on the front and rear sides of the axle body.

Axle seat 244 also includes inboard and outboard sidewalls 276, 278 extending from the C-shaped seat portion 272. Positioned on top of sidewalls 276, 278 is a clamp group mounting surface 280. Clamp group mounting surface 280 is positioned directly above vehicle axle 30, as best shown in FIG. 11, and includes bores sized to receive fasteners.

Leaf spring 270 extends longitudinally, as described above, such that the spring seat area thereof extends over the clamp group mounting surface 280. An axle clamp top pad 264 is positioned on top of the spring seat area of leaf spring 270 and bolts 254 are used to clamp leaf spring 270 between top pad 264 and axle seat 244 symmetrically about the centerline of the vehicle axle, as best shown in FIG. 11. A metal-to-metal mechanical connection between the leaf spring 270 and the axle seat 244 is achieved.

The vehicle suspension includes an air spring 265 seated on and secured to axle clamp top pad 264. Air spring 265 is also secured to a vehicle frame rail (not shown) in known manner. The vehicle suspension also includes a leaf spring end attachment part 267, which preferably is constructed in accordance with the teachings and principles of the invention disclosed in U.S. Pat. No. 6,485,040 (Dudding), the disclosure of which is also hereby incorporated herein by reference. As shown, leaf spring 270 does not have a rear leaf spring eye. Accordingly, the fifth general section of leaf spring 270 is not a rear spring eye, but rather the rear attachment part section.

Figure 12:
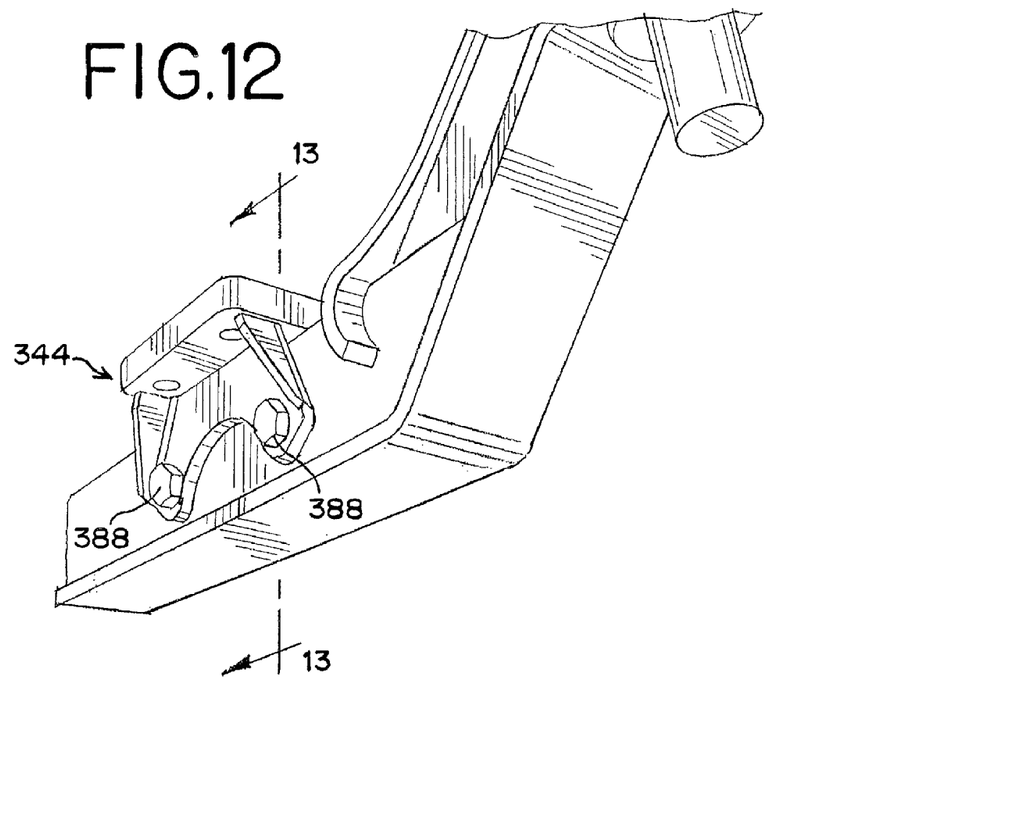
FIG. 12 is a perspective view of a vehicle axle and another embodiment of axle clamp assembly components.
Figure 13:
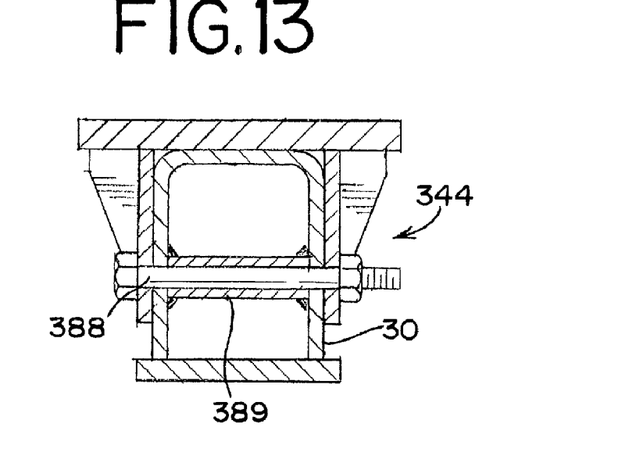
FIG. 13 is a sectional view of FIG. 12, taken along lines 13-13 thereof.

FIGS. 12-13 illustrate a fabricated axle seat 344 having a construction similar to the fabricated axle seat 244 illustrated in FIGS. 9-11. Fabricated axle seat 344, however, is secured to the axle body of vehicle axle 30 by fasteners 388 shown in the form of bolts, which extend through bores formed within the seat portion of the axle seat. With this axle seat and the others disclosed herein using fasteners, the fasteners could take a variety of forms such as rivets and Huckbolt® two-part fasteners having a pin and collar construction. In addition, as shown in FIG. 13, reinforcement components 389 shown in the form of tubes or channels are attached to the inside walls of the axle body to provide a more rigid structure. With this axle seat and the others disclosed herein using fasteners, the reinforcement components can be attached to the axle body by, for example, mechanical means (such as, for example, putting a coined recess in the axle body inner wall to receive a tube or channel reinforcement component and secure the reinforcement component by an interference fit). The reinforcement component may also be attached by adhesive or by welding (as shown). It will be appreciated that similar reinforcement components are also used with the other axle seats disclosed herein and using fasteners to attach to the axle.

Figure 14:
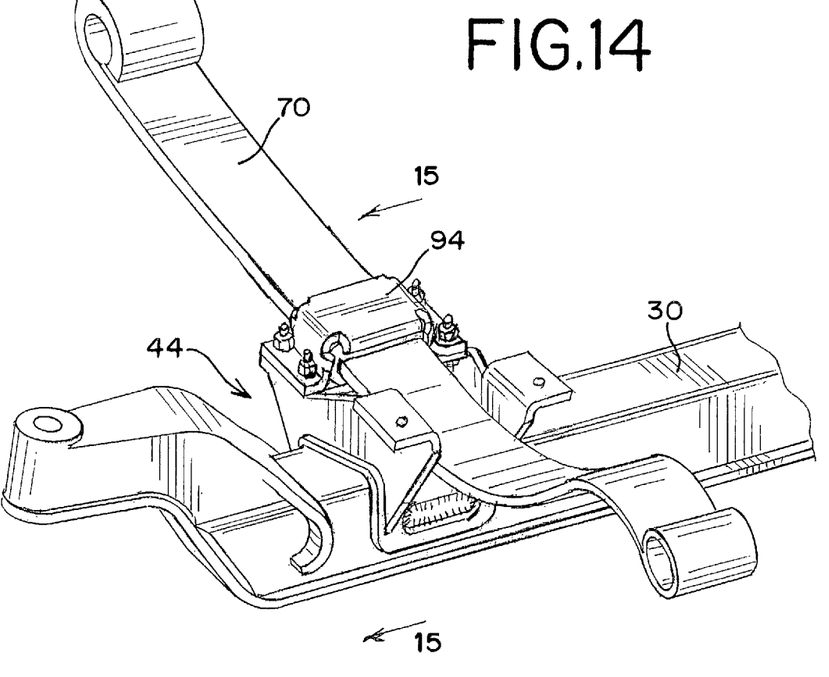
FIG. 14 is a perspective view of another embodiment of axle clamp assembly components.
Figure 15:
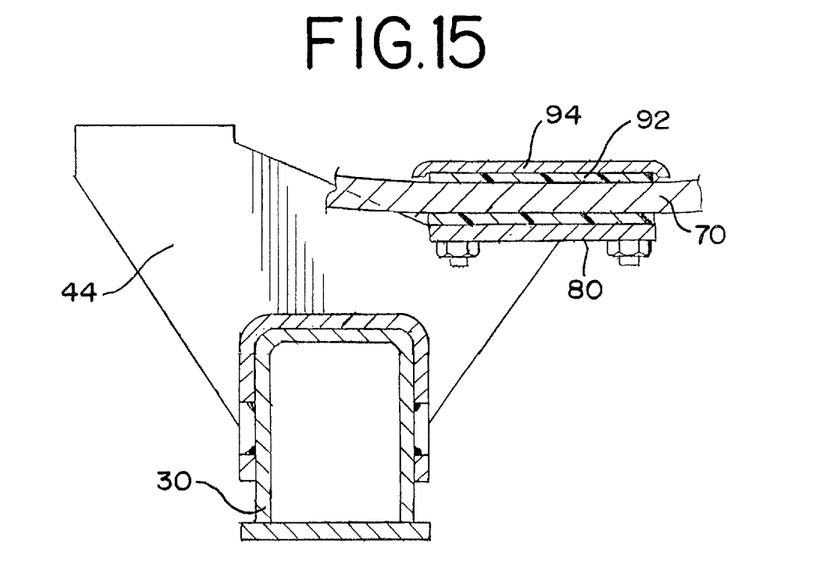
FIG. 15 is a sectional view of FIG. 14, taken along lines 15-15 thereof.

Similar to FIGS. 1-6, FIGS. 14 and 15 illustrate axle seat 44 press-fit and welded to the axle body of vehicle axle 30. In FIGS. 14 and 15, however, the spring seat section of leaf spring 70, namely that section of leaf spring 70 within the clamp group section of the suspension, is surrounded by a high durometer rubber material 92 or other suitable elastomer. A top plate 94 is fastened to the clamp group mounting surface 80 by fasteners extending through bores 82 (see also FIG. 6). The top plate 94 is sized and constructed to compress the rubber material 92 around the spring seat section of leaf spring 70 such that the forces due to such compression contain the leaf spring longitudinally and laterally. With this clamping technique, there is no hard mechanical (i.e. metal to metal) connection.

Figure 16:
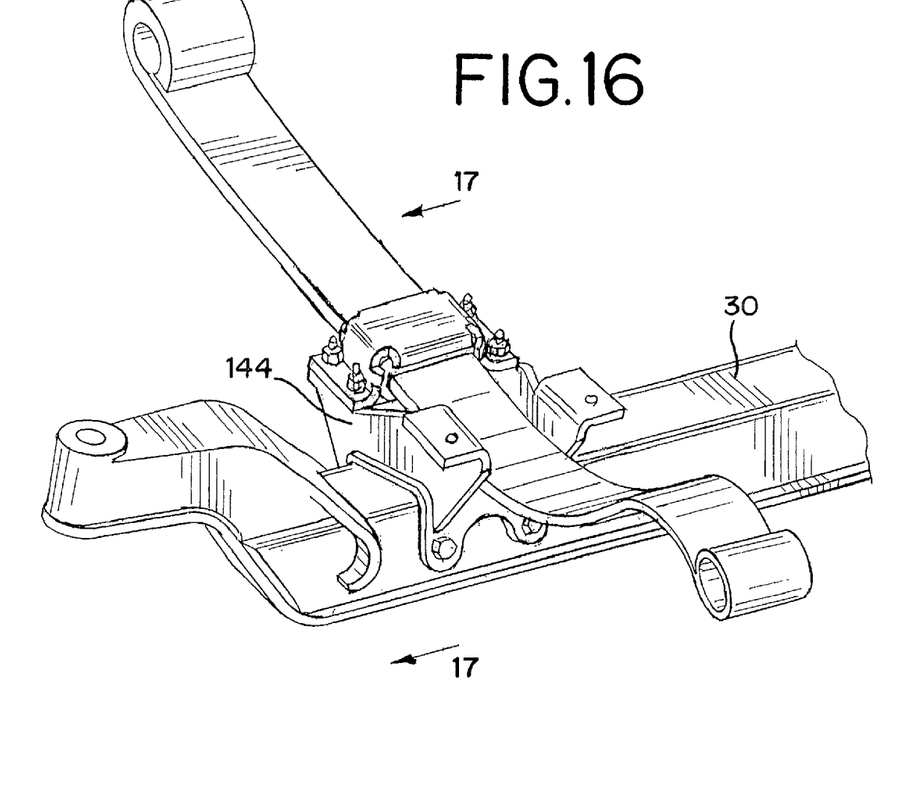
FIG. 16 is a perspective view of another embodiment of axle clamp assembly components.
Figure 17:
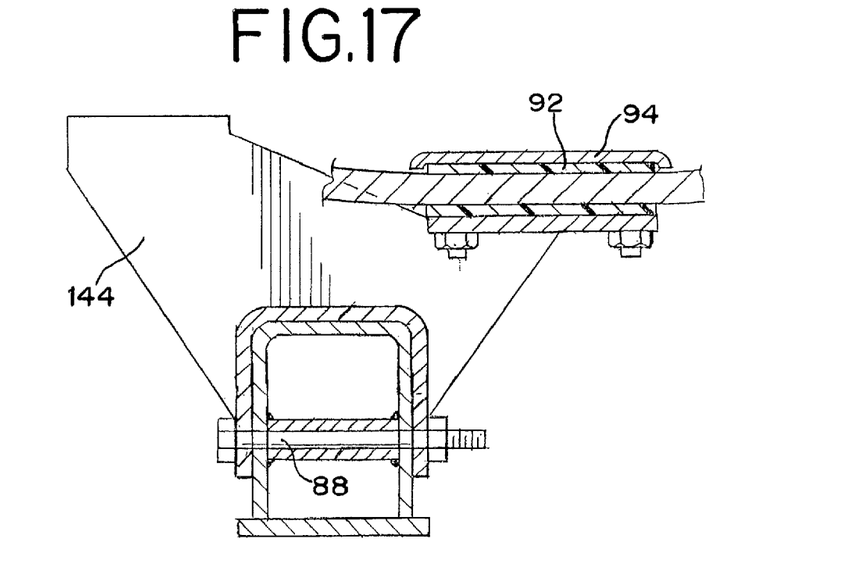
FIG. 17 is a sectional view of FIG. 16, taken along lines 17-17 thereof.

Similar to FIGS. 7 and 8, FIGS. 16 and 17 illustrate the axle seat 144 press-fitted and fastened to the axle body of vehicle axle 30 with the fasteners preferably extending through reinforcement components secured to the inner walls of the axle body. FIGS. 16 and 17 illustrate use of the clamping technique illustrated above, namely the spring seat section of the leaf spring is encapsulated by a high duromoter rubber material 92 and a top plate 94 is secured to the clamp group mounting surface of the axle seat. The top plate 94 compresses the rubber material 92, as described above with reference to FIGS. 14 and 15.

Figure 18:
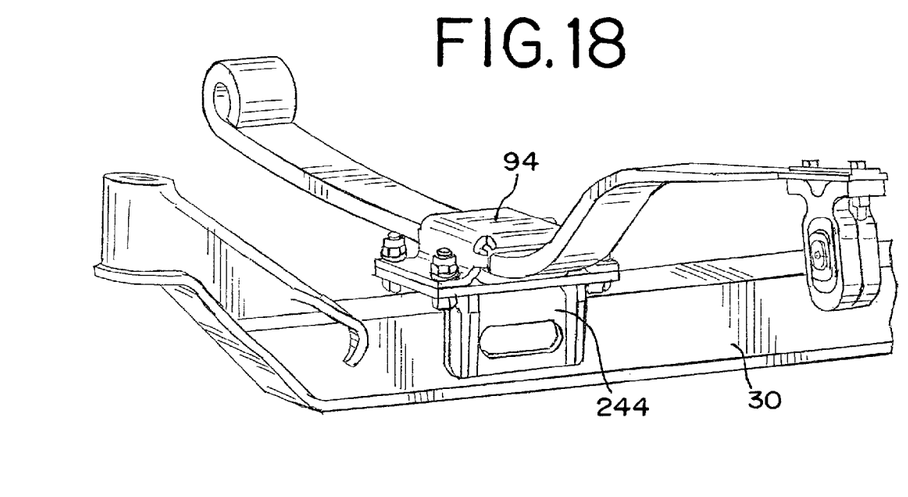
FIG. 18 is a perspective view of a vehicle axle and certain vehicle suspension components.
Figure 19:
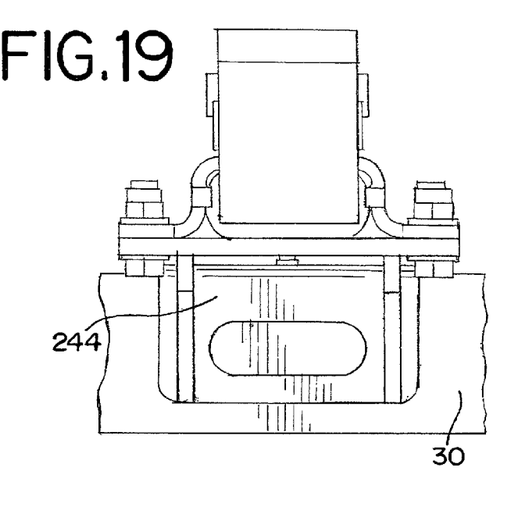
FIG. 19 is a front view of the vehicle axle and vehicle suspension components illustrated in FIG. 18.
Figure 20:
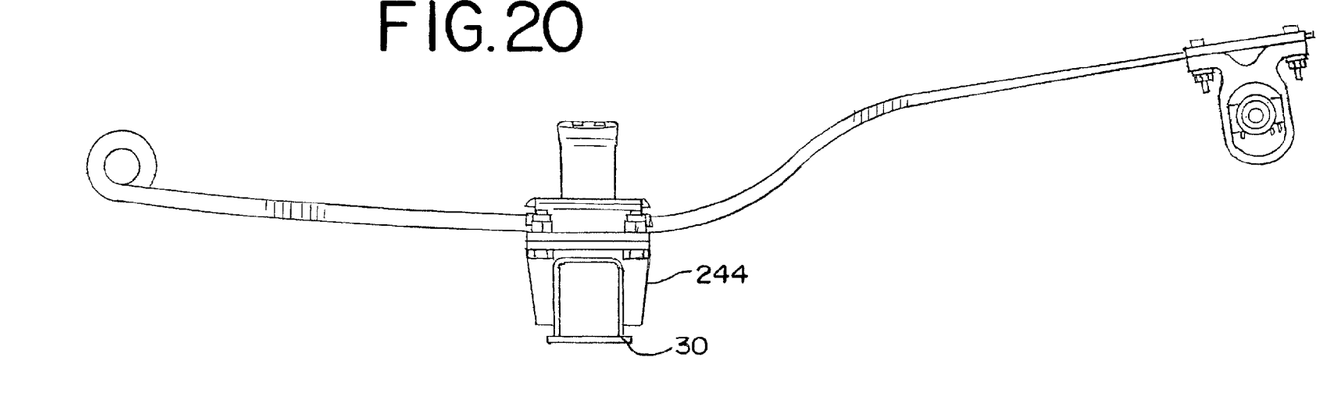
FIG. 20 is a side view of the vehicle axle and vehicle suspension components illustrated in FIGS. 18-19.
Figure 21:
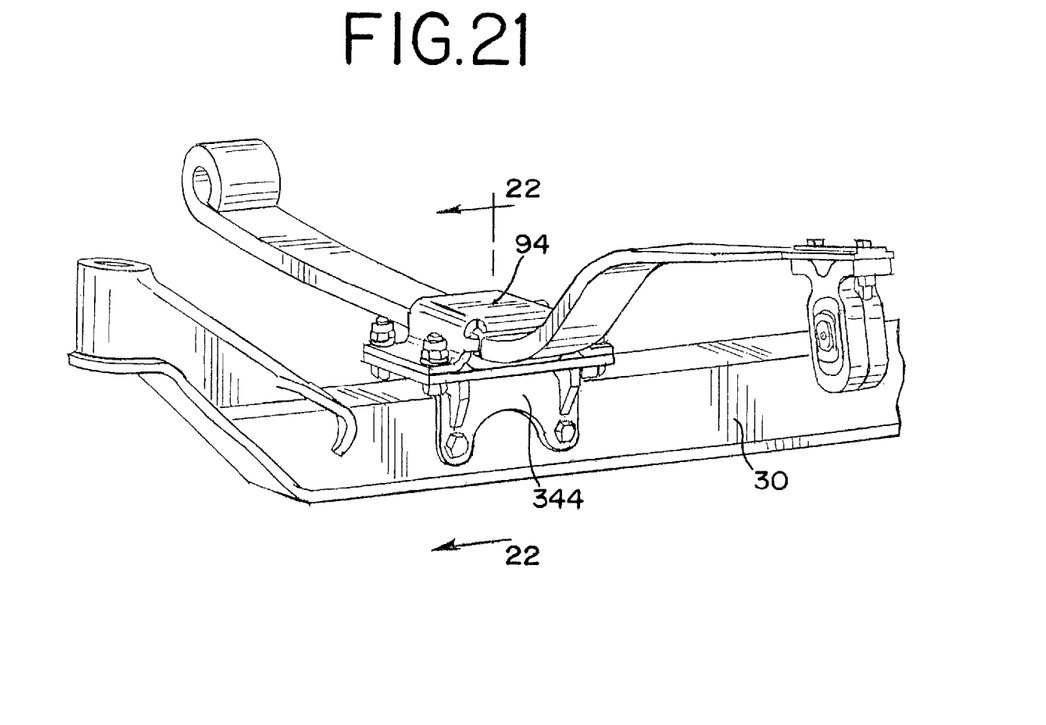
FIG. 21 is a perspective view of another embodiment of axle clamp assembly components.
Figure 22:
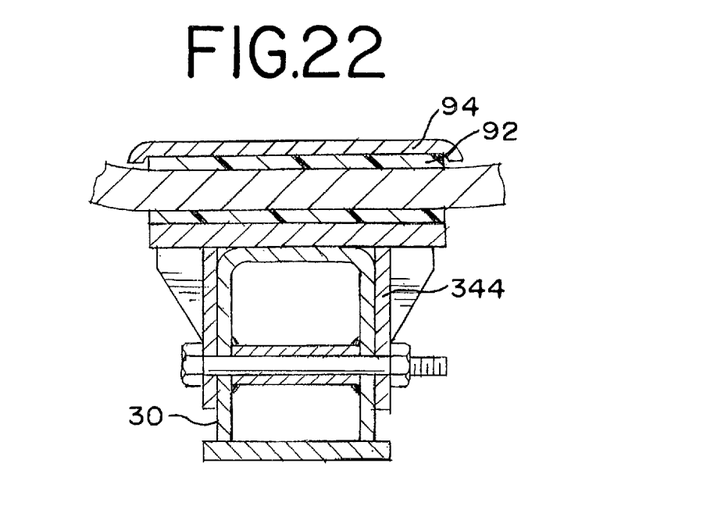
FIG. 22 is a sectional view of FIG. 21, taken along lines 22-22 thereof.

Similar to FIGS. 9-11, FIGS. 18-20 illustrate axle seat 244 press-fit and welded to the axle body of vehicle axle 30. FIGS. 18-20 illustrate use of the clamping technique shown in FIGS. 14-17 and described above. Similarly, FIGS. 21 and 22 illustrate the axle seat 344 press-fit and fastened to the axle body of vehicle axle 30, as shown in FIGS. 12 and 13; however, FIGS. 21 and 22 illustrate use of the clamping technique shown in FIGS. 14-20 and described above with reference to FIGS. 14-17.

As described above, axle seat 44 illustrated in FIGS. 1-6, 14-15 and axle seat 144 illustrated in FIGS. 7-8, 16-17 have their clamp group mounting surfaces positioned forward of the vehicle axle such that the clamp group is not positioned symmetrically about the centerline of the vehicle axle. By moving the clamp group ahead of the axle, a longer rear limb length for the leaf spring used in the suspension is achieved.

This yields a softer, more compliant rear limb. Conversely, a shorter front limb length for the leaf spring is achieved, yielding a stiffer front limb suitable to handle roll stiffness, as described in pending U.S. Ser. No. 09/572,736 (Dudding), filed May 17, 2000, the disclosure of which is hereby incorporated herein by reference. The movement of the clamp group forward of the vehicle axle is especially advantageous for suspensions used in those vehicles having limited available space for installing the suspension. Such packaging constraints are common in vocational truck vehicles, for example.

Having the clamp group positioned ahead of the vehicle axle also allows greater travel at the spindle/vehicle axle centerline due to the lever arm or motion ratio, which is based upon the ratio of the distance between the front leaf spring eye and the centerline of the clamp group section (first lever arm) to the distance between the front leaf spring eye and the vehicle axle centerline (second lever arm). In particular, maximum allowable deflection at a vehicle axle is typically limited due to the peak stress characteristic of the leaf spring material, which in turn limits the maximum spring deflection. With the axle clamp group positioned ahead of the vehicle axle, for a given deflection of the leaf spring at the axle clamp group, the spindle can deflect a greater distance due to the motion ratio. Accordingly, leaf spring stress for a given amount of axle travel is reduced, and maximum axle travel is increased beyond the limitations existing for conventional suspension designs having the clamp group configured symmetrically about the vehicle axle centerline.

The configuration of the front air spring 62 and rear air spring 68 positioned ahead of and behind the vehicle axle 30, respectively, provides additional load carrying capacity for the suspension and balances loads about the vehicle axle centerline. Accordingly, the air springs will help prevent leaf spring windup during acceleration and braking. The air springs are located to provide support for suspension load by using the advantage of the motion ratios. The air springs are sized to fit within the packaging envelope and still allow room for motion of the vehicle steering arm. The air springs allow the vehicle ride height to be level when the vehicle is fully loaded or overloaded, without inducing greater stress on the leaf spring.

The combination of the leaf spring and air springs support the suspension loads while allowing suspension articulation and providing primary roll stiffness.

With reference to FIGS. 14-22, in each of those figures there is shown the clamping technique where the seat area section of the leaf spring is encapsulated in rubber under compression. Because the leaf spring-to-axle connection using this clamping technique does not employ a hard mechanical metal-to-metal connection, the entire length of the leaf spring (including the seat area section thereof) can be used to support the vehicle weight. This increases the effective (utilizable) length of the leaf spring, which reduces its spring rate and improves vehicle ride. In addition, fatigue life of the leaf spring is improved.

While this invention has been described with reference to certain illustrative aspects, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A suspension for a vehicle axle extending laterally across a vehicle, comprising:
   a leaf spring extending longitudinally along a side of the vehicle having a front limb, a rear limb, and a spring seat section positioned between the front and rear limbs;
   an axle seat attached to the vehicle axle;
   a clamp group mounting surface of the axle seat positioned longitudinally offset from the vehicle axle; and
   a fastener used to clamp the spring seat section of the leaf spring to the clamp group mounting surface of the axle seat such that the clamped spring seat section is not symmetrically positioned about a centerline of the vehicle axle; a second fastener extending through the axle seat portion and the vehicle axle to attach the axle seat to the vehicle axle; and a reinforcement component extending between the front and rear sides of the vehicle axle and positioned directly adjacent to the second fastener.

2. The suspension as defined by claim 1 wherein the clamp group mounting surface of the axle seat is positioned entirely ahead of the vehicle axle.

3. The suspension as defined by claim 1 wherein the axle seat comprises a fabricated assembly.

4. The suspension as defined by claim 1 wherein the axle seat comprises a cast member.

5. The suspension as defined by claim 1 wherein the spring seat section of the leaf spring is encapsulated by an elastomer.

6. The suspension as defined by claim 1 wherein the axle seat comprises an axle seat portion attached to the vehicle axle and at least one sidewall extending from the axle seat portion, and wherein the clamp group mounting surface is positioned on the top of the at least one sidewall.

7. The suspension as defined by claim 1 wherein the axle seat is attached to a fabricated vehicle axle.

8. A suspension for a vehicle axle of the type extending laterally across a vehicle and having a front side and a rear side, comprising:
   a leaf spring extending longitudinally along a side of the vehicle having a spring seat section;
   an axle seat comprising an axle seat portion attached to the vehicle axle and at least one sidewall extending from the axle seat portion;
   a clamp group mounting surface of the axle seat positioned on the top of the at least one sidewall and directly above the vehicle axle;
   a fastener used to clamp the spring seat section of the leaf spring to the clamp group mounting surface of the axle seat;
   a second fastener extending through the axle seat portion and the vehicle axle to attach the axle seat to the vehicle axle; and
   a reinforcement component extending between the front and rear sides of the vehicle axle and positioned directly adjacent to the second fastener.

9. The suspension as defined by claim 8 wherein the spring seat section of the leaf spring is encapsulated and compressed by an elastomer.

10. The suspension as defined by claim 8 wherein the axle seat comprises a fabricated assembly.

11. The suspension as defined by claim 8 wherein the axle seat comprises a cast member.

12. The suspension as defined by claim 8 wherein the axle seat portion is attached to a fabricated vehicle axle.

13. The suspension as defined by claim 8 wherein the reinforcement component comprises a channel.

14. The suspension as defined by claim 8 wherein the reinforcement component comprises a tube.

15. A suspension for a vehicle axle of the type extending laterally across a vehicle and having a front side and a rear side, comprising:
   a leaf spring extending longitudinally along a side of the vehicle having a spring seat section;
   an elastomer encapsulating the spring seat section of the leaf spring;
   an axle seat comprising an axle seat portion attached to the vehicle axle and at least one sidewall extending from the axle seat portion;
   a clamp group mounting surface of the axle seat positioned on the top of the at least one sidewall and directly above the vehicle axle;
   a fastener used to clamp the spring seat section of the leaf spring to the clamp group mounting surface of the axle seat and compress the elastomer against the spring seat section of the leaf spring;
   a second fastener extending through the axle seat portion and the vehicle axle to attach the axle seat to the vehicle axle; and
   a reinforcement component extending between the front and rear sides of the vehicle axle and positioned directly adjacent to the second fastener.

16. The suspension as defined by claim 15 wherein the axle seat comprises a fabricated assembly.

17. The suspension as defined by claim 15 wherein the axle seat comprises a cast member.

18. The suspension as defined by claim 15 wherein the axle seat portion is attached to a fabricated vehicle axle.

19. A vehicle suspension system, comprising:
   a vehicle axle extending laterally across a vehicle centerline, said vehicle axle having a front side, a rear side, a hollow section defined between the front and rear sides, a first bore defined in the front side, and second bore defined in the rear side;
   an axle seat comprising
      a clamp group mounting surface, and
      a C-shaped seat portion which is press-fit onto the vehicle axle, with a front side of the seat portion extending over a portion of the front side of the vehicle axle and a rear side of the seat portion extending over a portion of the rear side of the vehicle axle, wherein
         a third bore is defined in the front side of the seat portion and aligned with the first bore, and
         a fourth bore is defined in the rear side of the seat portion and aligned with the second bore;
   a longitudinally extending leaf spring having a spring seat section;
   a spring fastener used to clamp the spring seat section of the leaf spring to the clamp group mounting surface of the axle seat; and
   a seat fastener extending through the first and second bores of the vehicle axle and the third and fourth bores of the seat portion to attach the axle seat to the vehicle axle.

20. The suspension system as defined by claim 19, further comprising a reinforcement component extending between the front and rear sides of the vehicle axle and positioned directly adjacent to the seat fastener.

* * * * *